Jan. 28, 1930.  J. MÉRY  1,744,788
FOCUSING DEVICE FOR VIEW TAKING CINEMATOGRAPHIC CAMERAS
Filed Dec. 4, 1928  4 Sheets-Sheet 1

Patented Jan. 28, 1930

1,744,788

UNITED STATES PATENT OFFICE

JEAN MÉRY, OF EPINAY, FRANCE

FOCUSING DEVICE FOR VIEW-TAKING CINEMATOGRAPHIC CAMERAS

Application filed December 4, 1928, Serial No. 323,752, and in France December 15, 1927.

With the known view taking cinematographic cameras, the operator who is engaged with focusing upon the film by transparency, will see either but little or not at all the photographic image in the view taking window, by reason of the thickness and opacity of certain emulsions, which are often colored, so that the proper focusing can only be effected by removing the film band and substituting a ground glass plate.

After the focusing and adjustment have been effected, the said plate must be removed and the film put in place, this occasioning a loss of time, and further, when the camera is opened for focusing purposes, the whole of the film which has been taken out will thus be fogged and this part of the film will be lost. It is also to be observed that this complicated although essential operation must be repeated many times when the camera is in use, so that the expense is much increased.

When the view is properly focused in place, the operator sets his camera in motion, but he is then unable to observe the scene, except in the clear finder which is only approximately adjusted. Even supposing that this finder has been recently adjusted, he can indeed maintain any particular person in the field, but cannot verify the sharpness of the image, and the image of this person will be out of focus if he moves forward or backward beyond the proper limits.

The present invention relates to an apparatus for the focusing and adjustment of the image upon a ground glass plate, or even upon the film, while fogging no part of the film, or at most a single image portion, and particularly, the operator is enabled to observe on the ground glass during the motion of the apparatus, all of the different persons or objects and to maintain a sharp image of each.

The said apparatus may also be provided with lenses of short focus and wide opening, and is adapted for all the "faking" of modern practice.

For this purpose, the apparatus comprises a ground glass plate which can be moved from the outside and can be brought into the exposure aperture or window in order to accurately focus the image. During the exposure of the film, the said plate receives by means of a second lens the successive images at the same time that the film receives them from the principal lens.

The accompanying drawing shows by way of example an embodiment of the invention.

The said apparatus is of the type comprising a revolving device or turret carrying the lenses, which device may be moved forward or backward for the focusing and adjustment.

Figure 1:
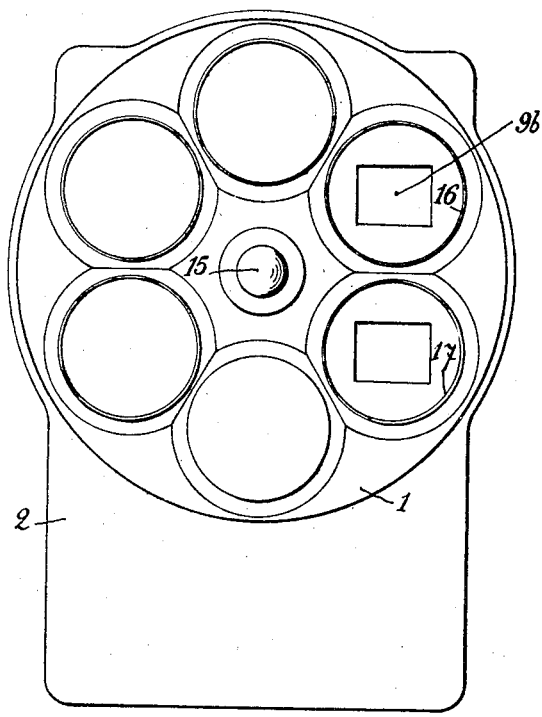
Fig. 1 is a front elevation of the apparatus.
Figure 5:
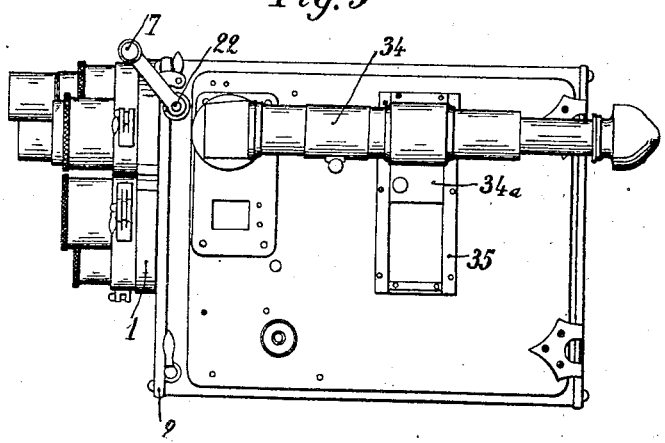
Fig. 5 is a general side view of the apparatus.

The revolving lens holder 1 which is mounted on the front end 2 is adapted to pivot on its axle 15 (Fig. 1) in order to change the lens, and it can also be moved forward and back upon the said axle for focusing purposes. The said lens holder carries six lens sockets, for instance, which are placed at the respective vertices of a hexagon and are adapted for the insertion of the lenses.

Two of the said sockets 16 and 17 are situated opposite two respective rectangular apertures or windows which extend entirely through the front end and a partition plate 4. The bottom window is used for the view taking and the top window serves for the finder.

In this manner the socket 17 will hold the anastigmatic lens for the view taking, and the socket 16 will hold an inexpensive lens of the rectilinear type which has preferably the same focal distance. A rotary shutter 3 is mounted on the shaft 14 at the rear of the front end 2, and it is adapted to close off the window 17 but not the window 16.

The plate 4 receives the film in a shallow longitudinal slot 4ª covered by two shutters 11 and 11ª, each pierced with an aperture. The said shutters carry adjacent the respective apertures the prisms 9 and 10 which are contained in the casings 9ª—10ª. The two shutters are mounted on double hinges 25—26 which are adapted to open towards the interior of the apparatus for the insertion of the film into the slot 4ª.

A long rod 5 mounted on suports 6—6ª serves as an axle for the rotation of the shutters 11—11ª which may also slide downwardly on said axle, thus substituting the prism 9 for the prism 10 adjacent the lens 17. The fastening catches for the shutter also participate in this sliding motion. The said catches, shown in the drawing at 29, are laterally slidable on the shutters and are rearwardly urged by a spring 30 bearing upon an axle 31 secured to each shutter.

Figure 2:
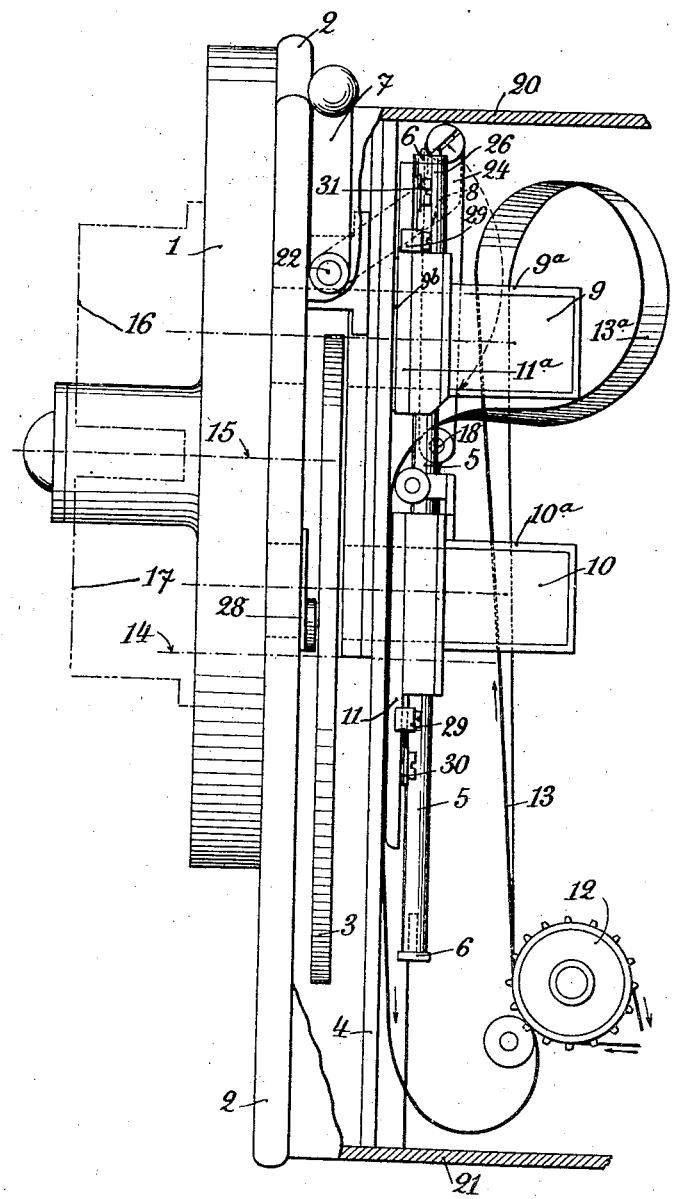
Fig. 2 is a side view, with parts of the box broken away showing the interior of the apparatus.
Figure 3:
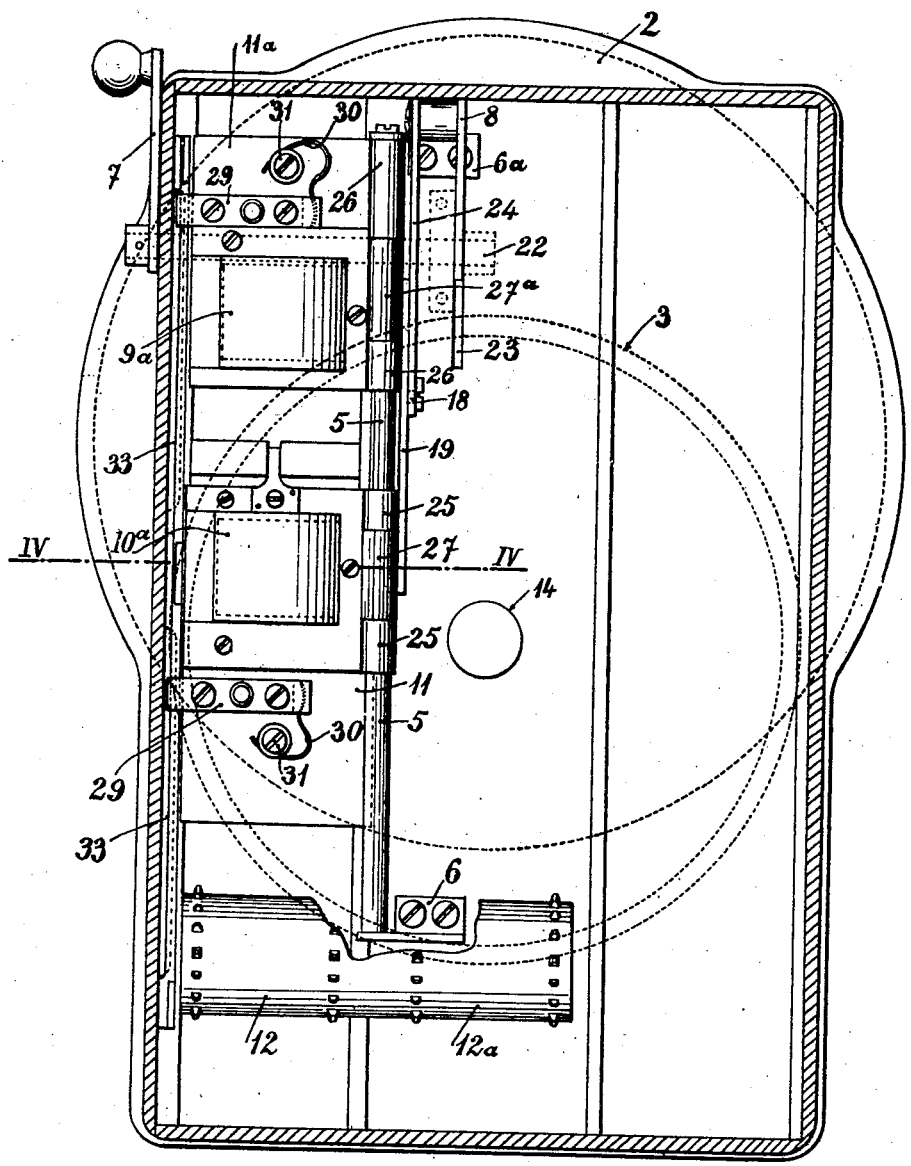
Fig. 3 is a rear vertical section of the apparatus.
Figure 4:
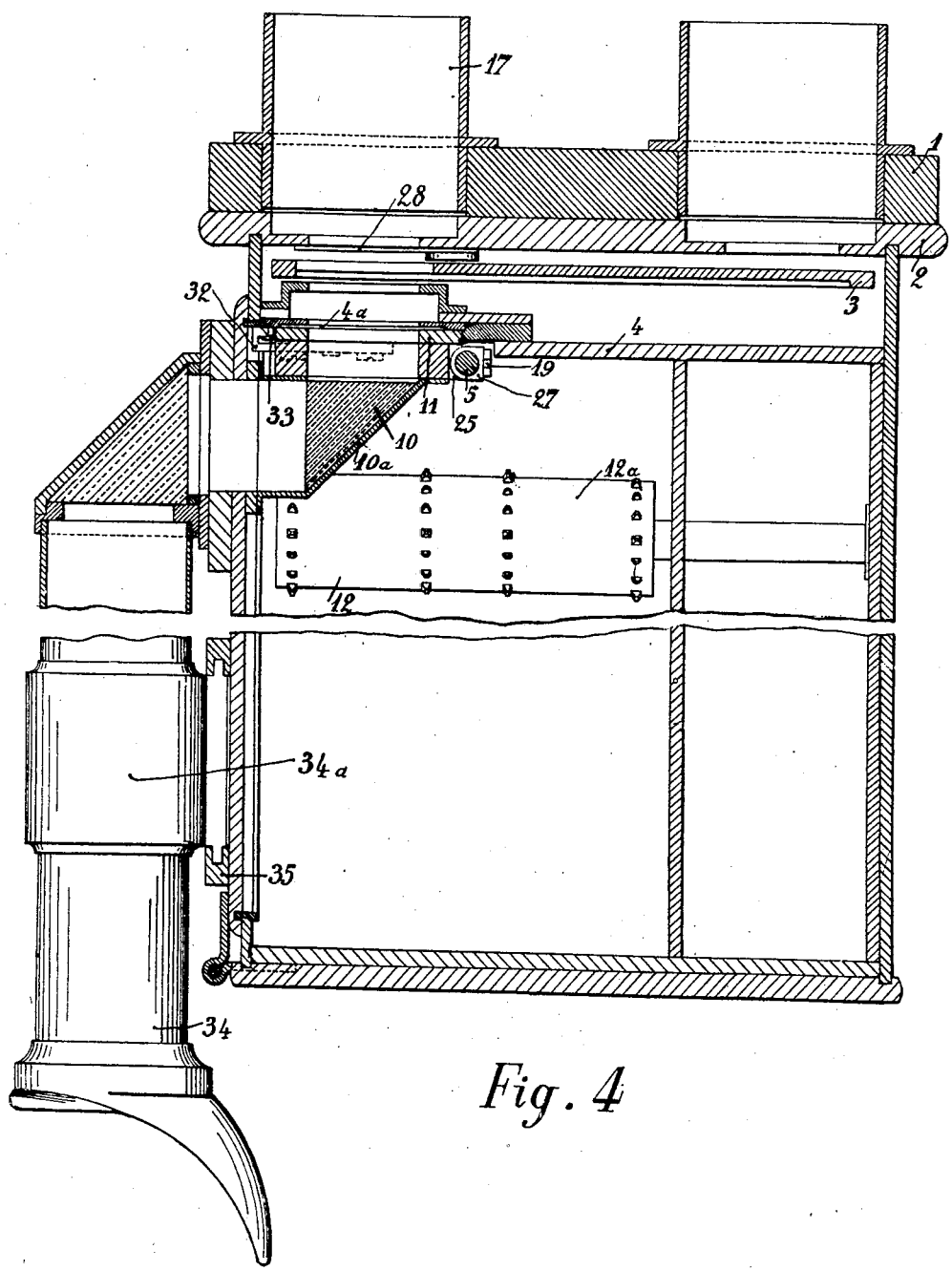
Fig. 4 is a horizontal section on the line IV—IV of Fig. 3.

In the closed position, their pointed ends 32 engage in two respective vertical slots 33 in the box, so that the catches may be vertically moved without unfastening. The said shutters are caused to slide downwardly by means of an outer crank 7 (Figs. 2 and 3) whose shaft 22 actuates an inner crank 8 slidable in a slot 23 in the partition 4. The said crank 8 actuates a link 24 pivoted at 18 to a link 19 connecting the two shutters together. This connection takes place through the medium of the tubes 27—27ª inserted between the hinges of the shutters and riveted to the link 19, so that the said tubes may slide on the rod 5 but cannot rotate like the hinges. The arrangement is such that ¼ rotation of the shaft of the crank 7 causes the complete ascent or descent of the shutters.

In the top shutter 11ª is disposed in front of the prism and in the plane of the slot 4ª a ground glass plate 9ᵇ on which is formed the image of the finder lens, which image is then reflected outwardly by the prism 9.

During the descent of the shutters 11—11ª, said ground glass plate 9ᵇ comes in line with the view taking window. The film 13—13ª disappears behind the prism 9 as it descends, so that the operator stationed at the side of the camera may at this time see the image from the said lens 17 upon the said ground glass plate through the prism 9. The image seen at the top will be the same as the image seen at the bottom, if the lenses 16 and 17 have the same focal distance.

By raising the shutters, the operator can bring the film adjacent the lower or view taking window, and can bring the ground glass adjacent the upper or finder window, and he is thus enabled to follow the scene which he is taking. At this time, the lower prism 10 may serve for observations of the film as well as for all matching and superposed exposures. The film 13 from the feeding device 12ª (Fig. 3) rises in the apparatus to the point 13ª, then forms a loop and travels to the left before the shutter 11 (Fig. 2) thus returning into engagement with the feeding device 12 and finally entering the film holder. Suitable closing shutters or flaps 28 are provided in the rear of the front end 2 so as to prevent all fogging during the rise and descent of the doors.

On the side of the apparatus is mounted a vertically movable lens 34 for observing at any time the images of the two windows reflected by the prisms. It is preferable to employ for this purpose a lens which affords a rectified image. The said lens is mounted in a support 34ª which may be caused to follow the vertical movements of the shutters 11—11ª, or which may be moved by hand independently of said shutters, and herein the said support is guided by a slot 35 so that it may be brought either into the focusing position or into the finding position.

Claims:

1. In a cinematographic film camera, the combination of a box, lenses mounted at the front of said box, two superposed windows in the front wall of the box adjacent the respective lenses, means guiding the film at the rear of the lower window, a movable ground glass plate which may be brought alternately into coincidence with the respective windows, a prism disposed in the rear of the said ground glass plate and film, and rigidly connected with said plate, and a lens mounted at the exterior of the box and so disposed that the images on the ground glass plate reflected by the said prism may be observed at the exterior, said film-guiding means allowing the said ground glass plate and prism to be inserted between the lower window and the film.

2. In a cinematographic film camera, the combination of a box, lenses mounted at the front of said box, two superposed windows in the front wall of the box adjacent the respective lenses, means guiding the film at the rear of the lower window, a movable ground glass plate which may be brought alternately into coincidence with the respective windows, a prism disposed at the rear of the said ground glass plate and film and rigidly connected with said plate, a second prism secured to the movable device formed by the ground glass plate and the first-mentioned prism, which second prism is situated at the rear of the film in coincidence with the lower window when the first-mentioned prism is in coincidence with the upper window, and a movable lens which is disposed at the exterior of the box and may be brought alternately into coincidence with the two prisms.

3. In a cinematographic film camera, the combination of a box, lenses mounted at the front of said box, two superposed windows in the front wall of the box a vertical rod at one side of the said windows, two shutters adapted to pivot and to slide upon said rod, means holding said shutters at a fixed distance apart, a ground glass plate and a prism disposed upon the upper shutter, a prism disposed upon the lower shutter, a stationary guide parallel with said vertical rod, fastening means provided on said shutters and adapted to engage the said guide whereby the said shutters will be kept parallel with the front wall of the box while allowed to slide vertically, and means guiding the film at the rear of the lower window, which means enable the ground glass plates and upper prism to take a position between the lower window and the film.

In testimony whereof I have hereunto affixed my signature.

JEAN MÉRY.